(12) United States Patent
Allard

(10) Patent No.: US 6,332,852 B1
(45) Date of Patent: Dec. 25, 2001

(54) VARIABLE RATIO DRIVE SYSTEM

(75) Inventor: John Allard, Saint-Jean-des-Piles (CA)

(73) Assignee: 3561020 Canada Inc., Quebec (CA)

( * ) Notice: Subject to any disclaimer, the term of this patent is extended or adjusted under 35 U.S.C. 154(b) by 15 days.

(21) Appl. No.: 09/580,484

(22) Filed: May 30, 2000

(51) Int. Cl.[7] ........................................... F16H 9/10
(52) U.S. Cl. ................... 474/53; 474/49; 474/80
(58) Field of Search .................... 474/47, 48, 49, 474/50, 53, 55, 56, 57, 80, 81

(56) References Cited

U.S. PATENT DOCUMENTS

| | | |
|---|---|---|
| 3,956,944 | 5/1976 | Tompkins . |
| 3,969,948 | 7/1976 | Pipenhagen, Jr. . |
| 3,994,180 | 11/1976 | Ackerman . |
| 4,030,373 | 6/1977 | Leonard . |
| 4,129,044 | 12/1978 | Erickson et al. . |
| 4,260,386 | 4/1981 | Frohardt . |
| 4,342,559 | 8/1982 | Williams . |
| 4,487,085 | 12/1984 | Collins . |
| 4,493,678 | 1/1985 | Husted . |
| 4,498,351 | 2/1985 | Ahoor . |
| 4,575,367 | 3/1986 | Karmel . |
| 4,608,034 | 8/1986 | Reswick . |
| 4,618,331 | 10/1986 | Deal . |
| 4,642,070 | 2/1987 | Walker . |
| 4,652,250 | 3/1987 | Reswick . |
| 4,684,358 | 8/1987 | Vahabzadeh . |
| 4,740,190 | 4/1988 | Pike . |
| 4,743,041 | 5/1988 | Vazin . |
| 4,750,376 | 6/1988 | Walker . |
| 4,772,250 | 9/1988 | Kovar et al. . |
| 4,820,244 * | 4/1989 | Lander ................... 474/56 |
| 4,832,660 | 5/1989 | Leonard . |
| 4,843,899 | 7/1989 | Braunschweiler . |
| 4,850,939 * | 7/1989 | Chilcote et al. ......... 474/49 |
| 4,854,925 | 8/1989 | Chandrupatla . |
| 4,878,883 * | 11/1989 | Wheless ................. 474/51 |
| 5,013,284 | 5/1991 | Leonard . |
| 5,041,061 | 8/1991 | Leonard . |
| 5,065,638 | 11/1991 | Barens . |
| 5,094,653 | 3/1992 | Leonard . |
| 5,104,357 | 4/1992 | Leonard et al. . |
| 5,282,773 | 2/1994 | Gryspeedt . |
| 5,407,395 | 4/1995 | Kramer . |
| 5,468,191 | 11/1995 | Monahan . |
| 5,492,506 | 2/1996 | Lorance . |
| 5,582,555 | 12/1996 | Miller . |
| 5,643,116 | 7/1997 | Genzel et al. . |
| 5,688,199 | 11/1997 | Spirig . |
| 5,692,983 | 12/1997 | Bostelmann . |

FOREIGN PATENT DOCUMENTS

| | | |
|---|---|---|
| 3107255 A 1 | 9/1982 | (DE) . |
| 3214925 A 1 | 10/1983 | (DE) . |
| 3842992 * | 7/1990 | (DE) ................... 474/49 |
| 960 014 | 10/1949 | (FR) . |

* cited by examiner

Primary Examiner—David A. Bucci
Assistant Examiner—Vicky A. Johnson
(74) Attorney, Agent, or Firm—Nixon & Vanderhye PC

(57) ABSTRACT

A variable ratio drive system including at least one variable diameter sprocket is described herein. The variable diameter sprocket includes a support and at least three radially movable sprocket portions mounted to the support. A diameter changing mechanism is provided to selectively move the sprocket portions.

14 Claims, 10 Drawing Sheets

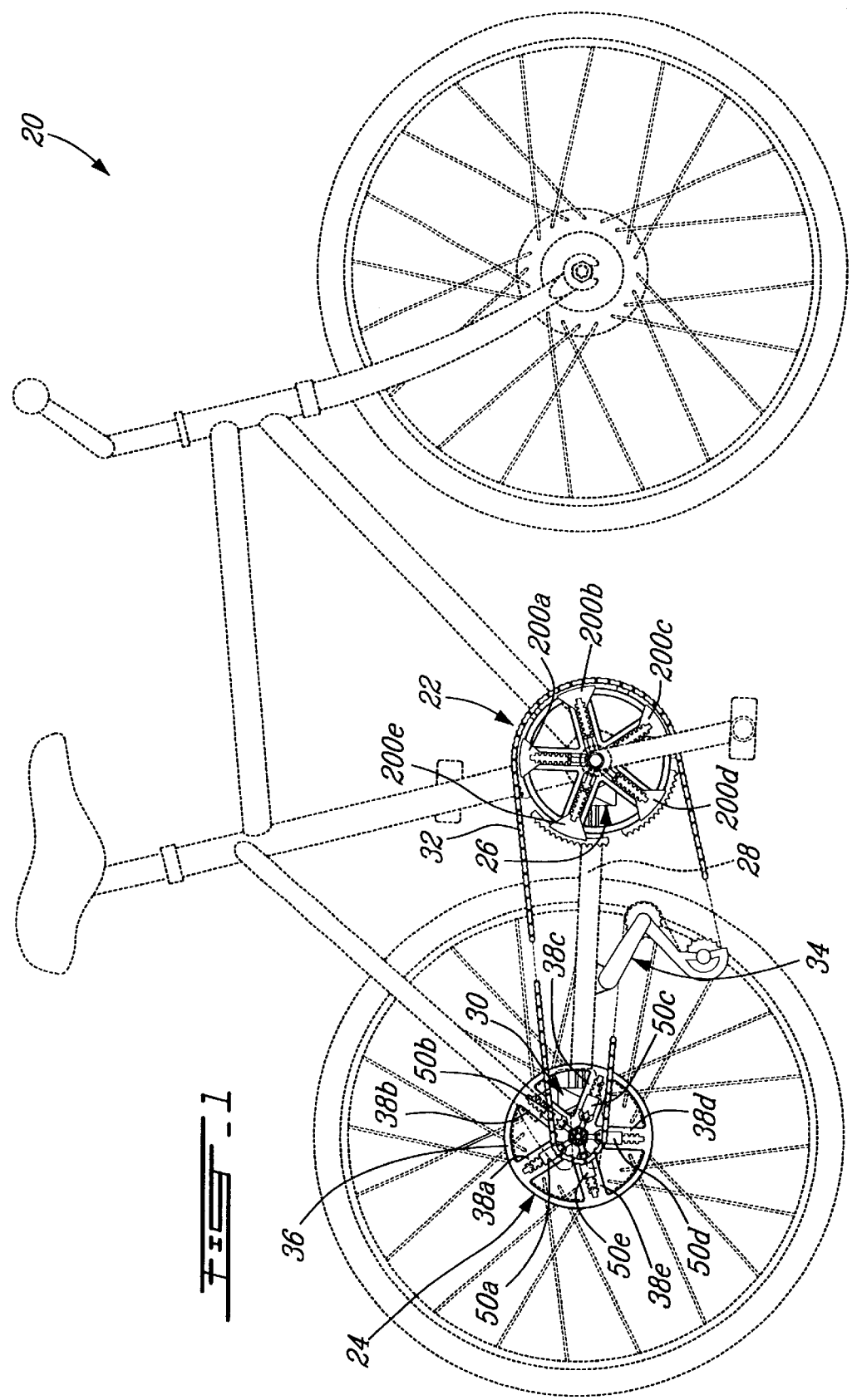

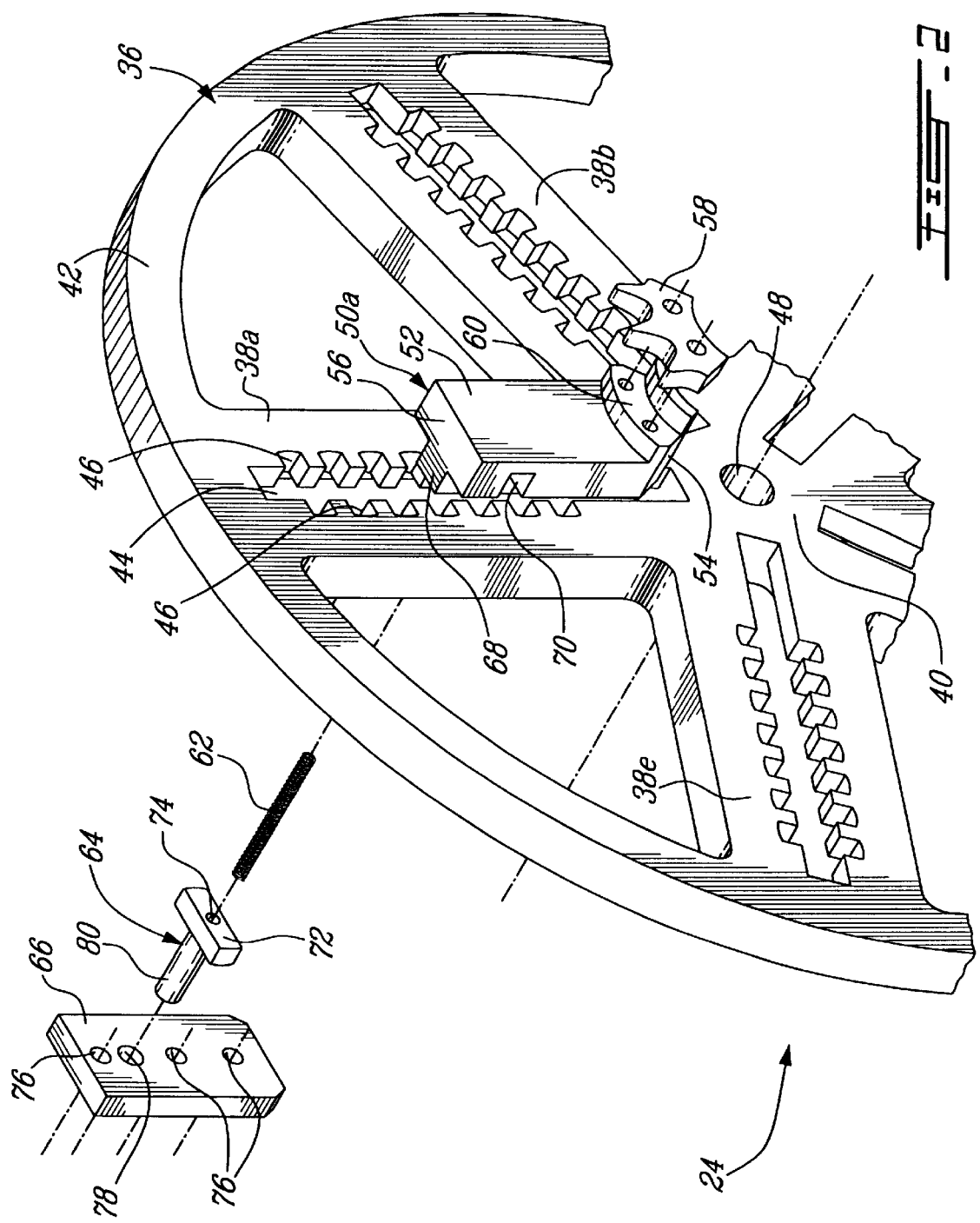

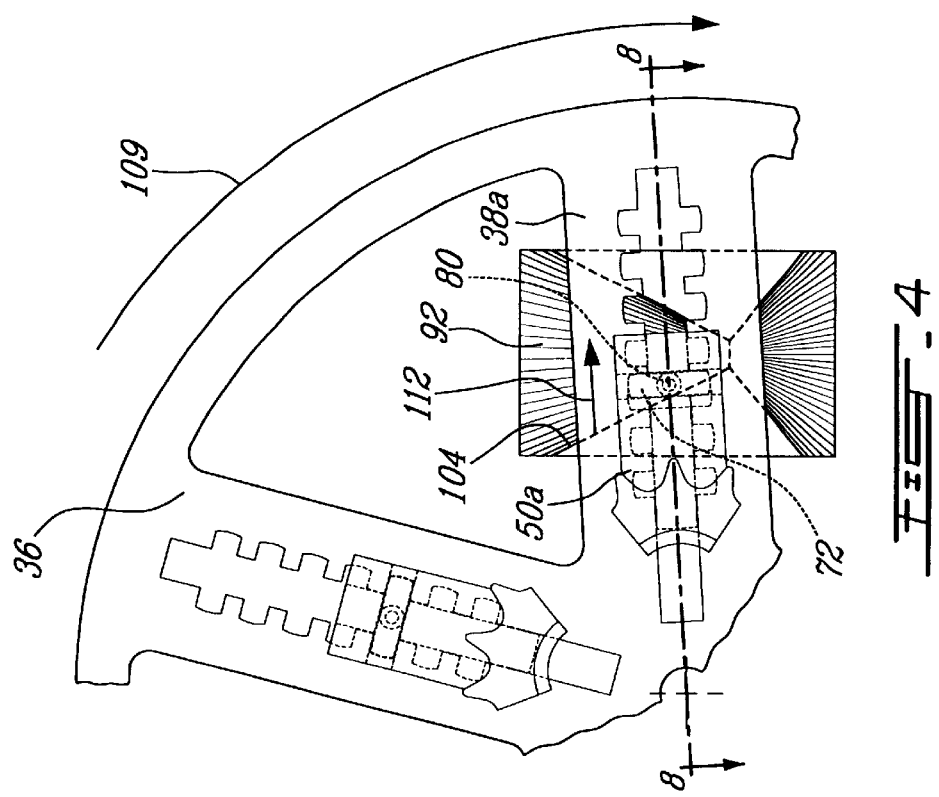
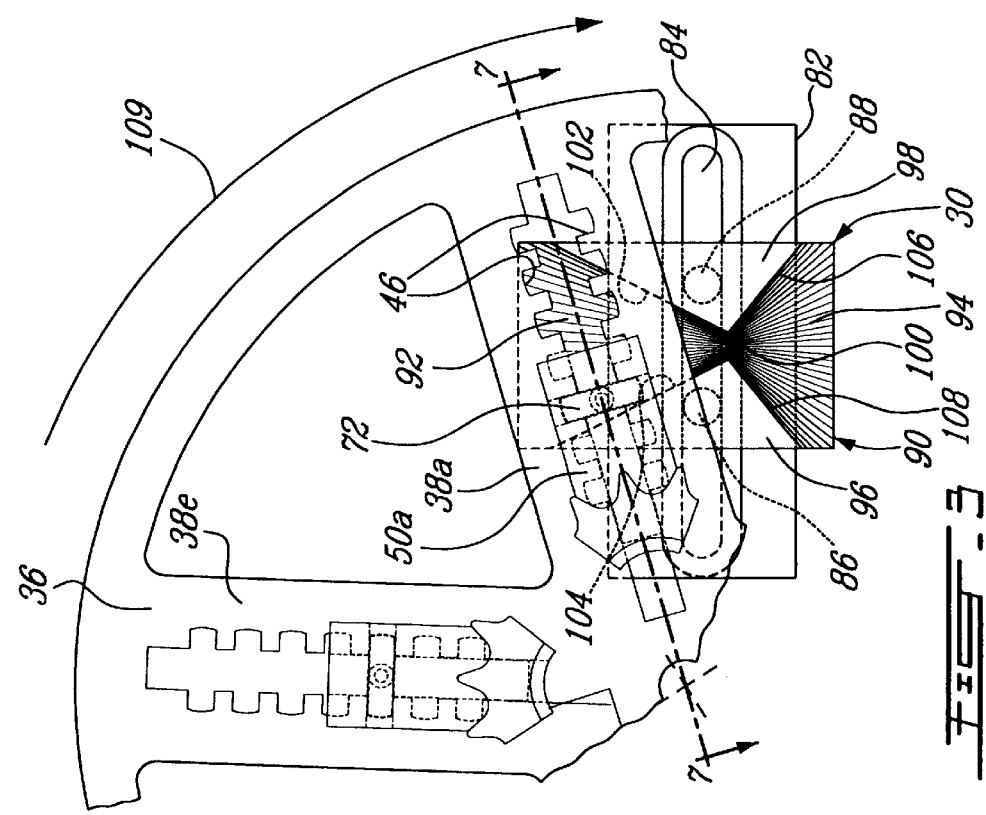

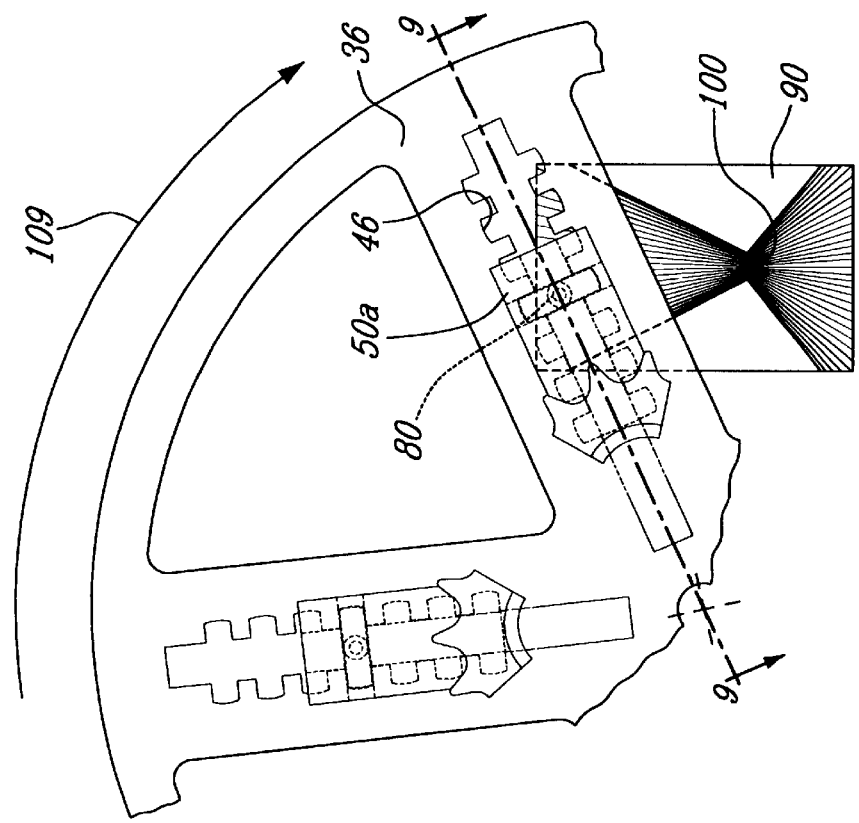
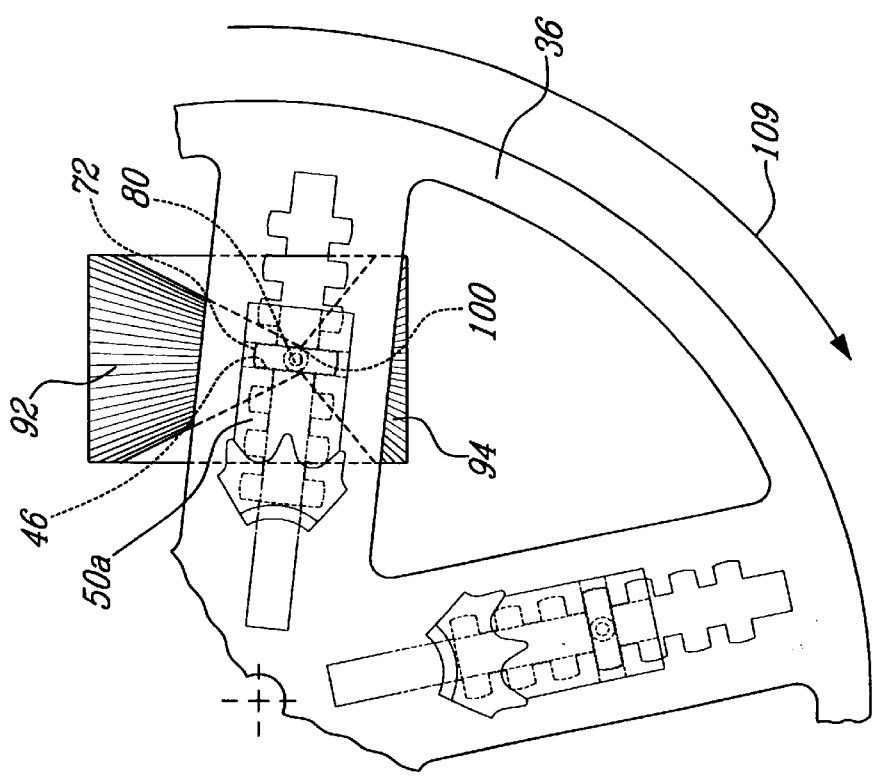

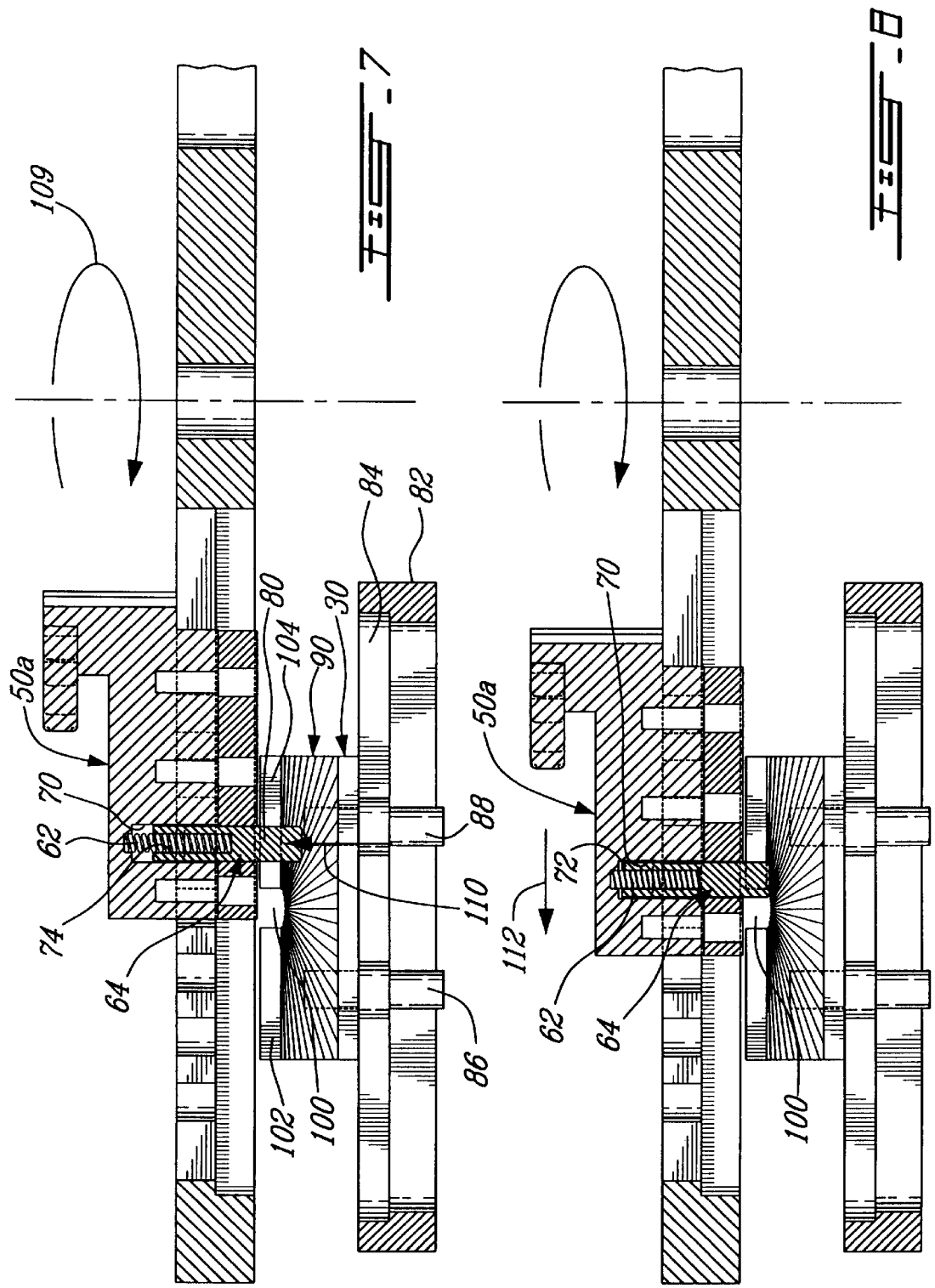

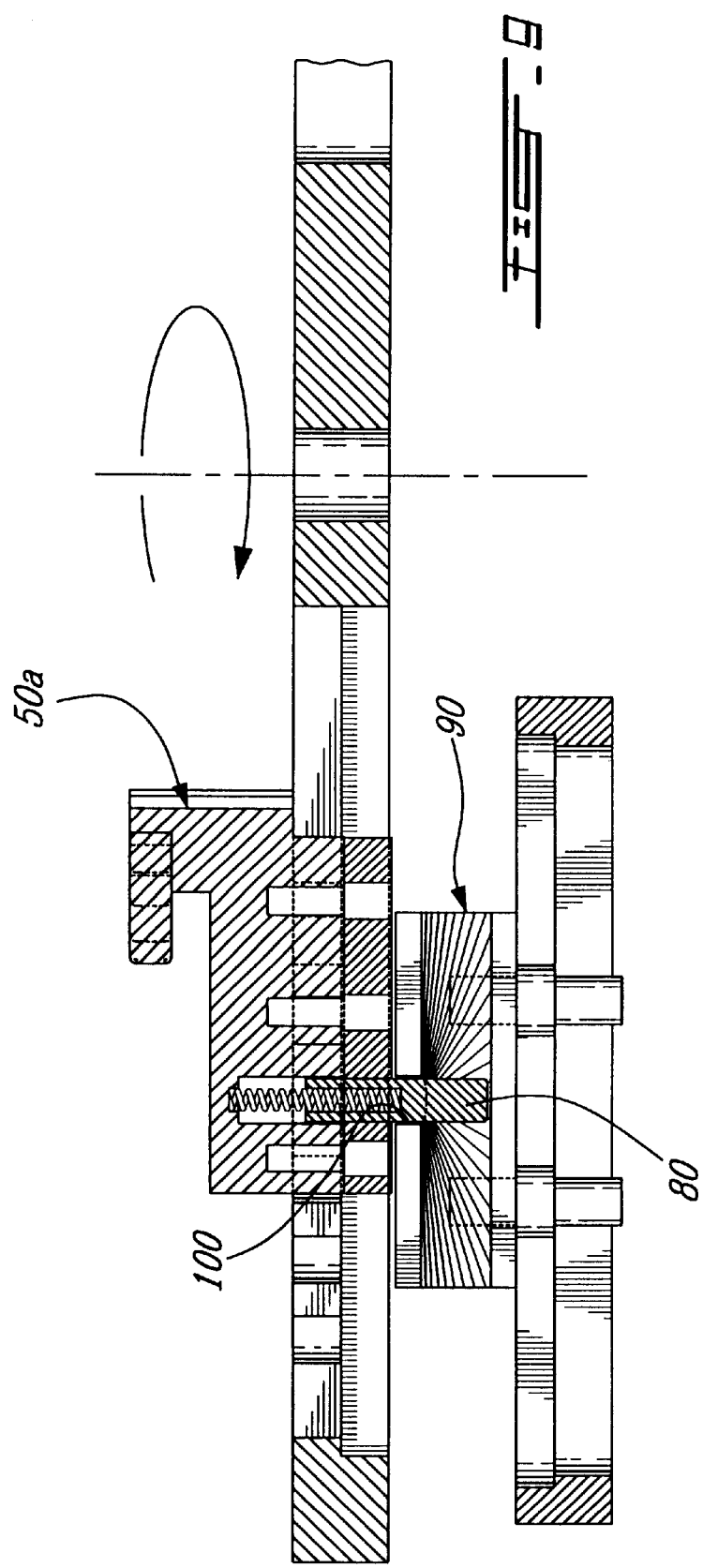

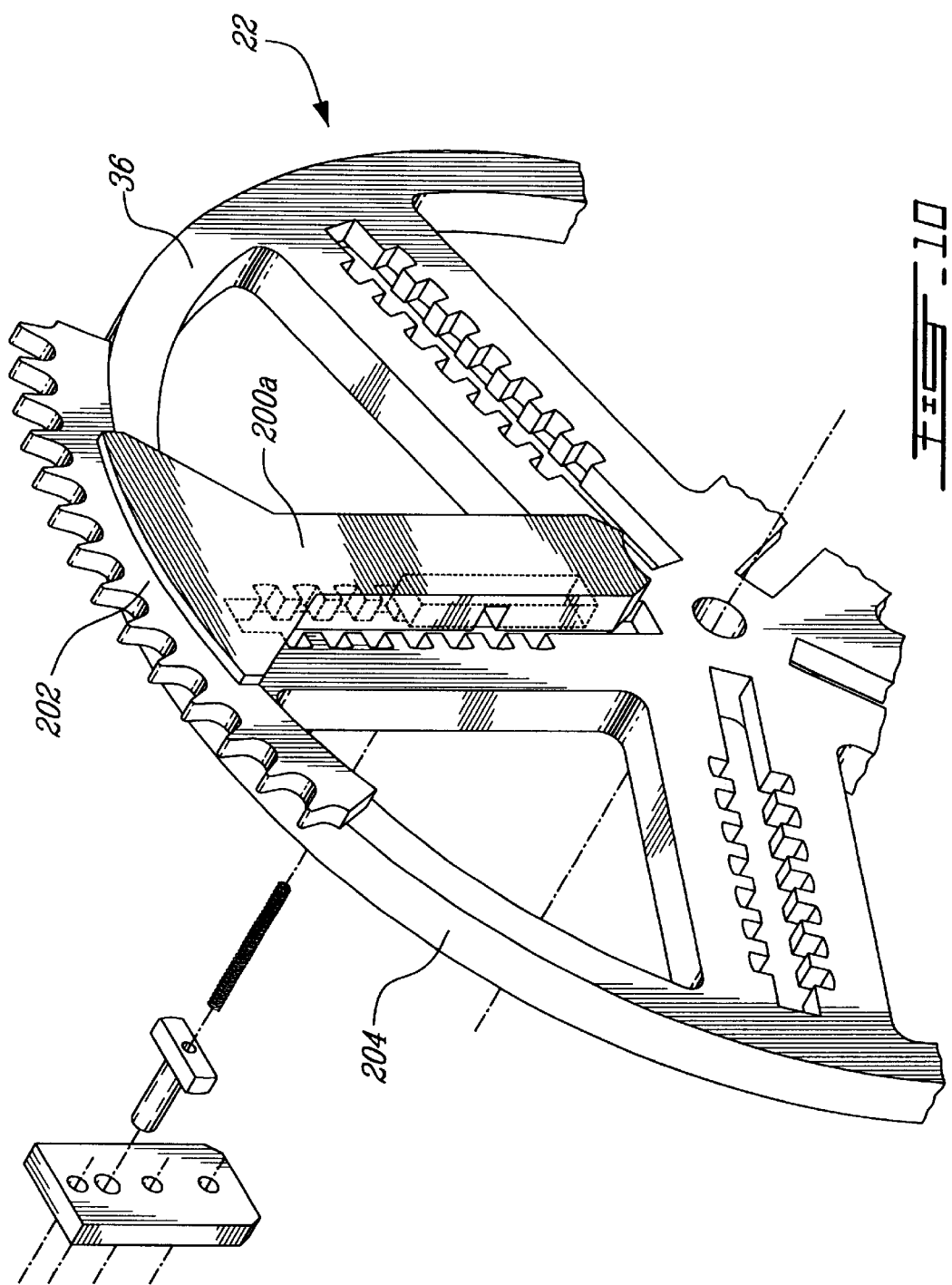

VARIABLE RATIO DRIVE SYSTEM

FIELD OF THE INVENTION

The present invention relates to drive systems for vehicles. More specifically, the present invention is concerned with a drive system having a variable ratio obtained through a variation of the diameter of a sprocket.

BACKGROUND OF THE INVENTION

Variable diameter sprockets are well known in the art. For example, U.S. Pat. Nos. 4,030,373; 4,832,660; 5,041,061; 5,013,284; 5,094,653; and 5,104,357 all naming Hamlin Leonard as an inventor, each describes variable speed drive systems for bicycles provided with variable diameter pulleys. As is well known, by modifying the diameter of the variable diameter pulley, the ratio of the front to rear pulleys is modified without requiring a cluster of sprockets.

The systems described by Leonard do not use a conventional bicycle chain but instead use a flexible driving means under the form of a V-belt. The different mechanisms described by Leonard have the same common drawback that the diameter changing mechanisms provided to modify the diameter of the pulley are generally complex.

The use of a V-belt is also a drawback since it must usually be heavily tensioned to prevent it from slipping from the pulleys. It is also to be noted that adverse temperature conditions, such as rain, may nevertheless cause the V-belt to slip in the pulleys.

To overcome the drawbacks described hereinabove with respect to the systems proposed by Leonard, the applicant describes in an international application published under publication number WO99/43539, a variable ratio drive system using a conventional chain and a simple sprocket diameter changing mechanism. It has been found however, that the friction between the sprocket diameter changing mechanism and the sprocket portions is somewhat detrimental to the performance of the drive system.

OBJECTS OF THE INVENTION

An object of the present invention is therefore to provide an improved variable ratio drive system.

It is a further object of the present invention to provide a variable ratio drive system using a conventional chain.

It is also an object of the present invention to provide a variable ratio drive system provided with an improved sprocket diameter changing mechanism.

SUMMARY OF THE INVENTION

More specifically, in accordance with the present invention, there is provided a variable ratio drive system comprising:
  a variable diameter sprocket including:
    a support having a rotation axis and at least three radial apertures; each aperture being provided with at least two stopping element;
    at least three sprocket portions, each being so mounted to a respective one of the three radial aperture of the support as to be radially movable therein; each of the three sprocket portions includes a movable element configured and sized to interconnect with the two stopping element to selectively maintain the sprocket portion in a desired radial position; each sprocket portion also includes a biasing element mounted thereto to bias the movable element towards the two stopping element;
  a sprocket diameter changing mechanism including:
    a fixed portion; and
    a movable portion mounted to the fixed portion; the movable portion including a pushing surface so positioned and configured as to overcome a biasing action of the biasing element through a pushing action on the movable element of the sprocket portion; the pushing action causing the disengagement of the movable element from one of the stopping element; the movable portion also including at least one guiding surface configured and sized to reposition the sprocket portion in a second desired position and to engage the movable element with a corresponding stopping element.

According to another aspect of the present invention, there is provided a variable ratio drive system comprising:
  a variable diameter sprocket including:
    a support having a rotation axis;
    at least three sprocket portions having a longitudinal body provided with opposite ends; each the three sprocket portions being so mounted to the support as to be radially movable with respect to the rotation axis; each of the three sprocket portions is so configured that it may be selectively maintained in a desired radial position; each the three sprocket portion comprising a dented portion provided near one of the opposite ends of the longitudinal body;
  a sprocket diameter changing mechanism configured to interact with the three sprocket portions to selectively maintain the sprocket portions in the desired radial position.

According to a third aspect of the present invention, there is provided a variable ratio drive system comprising:
  a variable diameter sprocket including:
    a support having a rotation axis and at least three sprocket portion retaining means each being provided with at least two sprocket portion position maintaining means;
    at least three sprocket portions, each being so mounted to a respective one of the three sprocket portion retaining means of the support as to be radially movable; each of the three sprocket portions includes means to interconnect with the two sprocket portion position maintaining means to selectively maintain the sprocket portion in a desired radial position; each sprocket portion also includes biasing means so mounted thereto to bias the interconnecting means towards the two sprocket portion position maintaining means;
  means for changing the diameter of the variable diameter sprocket, the sprocket diameter changing means including:
    a fixed portion; and
    a movable portion so mounted to the fixed portion as to be movable; the movable portion including means for overcoming a biasing action of the biasing means through a pushing action on the interconnecting means of the sprocket portion; the pushing action causing the disengagement of the interconnecting means from one of the sprocket portion retaining means; the movable portion also including at least one guiding means configured and sized to reposition the sprocket portion in a second desired position and to engage the interconnecting means with a corresponding sprocket portion retaining means.

According to a final aspect of the present invention, there is provided a variable ratio drive system comprising:
  first and second variable diameter sprockets, each including:
    a support having a rotation axis and at least three radial apertures; each aperture being provided with at least two stopping element;

at least three sprocket portions, each being so mounted to a respective one of the three radial aperture of the support as to be radially movable therein; each of the three sprocket portions includes a movable element configured and sized to interconnect with the two stopping element to selectively maintain the sprocket portion in a desired radial position; each sprocket portion also includes a biasing element mounted thereto to bias the movable element towards the two stopping element;

first and second sprocket diameter changing mechanisms each including:

a fixed portion; and a movable portion so mounted to the fixed portion as to be movable; the movable portion including a pushing surface so positioned and configured as to overcome a biasing action of the biasing element of a corresponding variable diameter sprocket through a pushing action on the movable element of the sprocket portion; the pushing action causing the disengagement of the movable element from one of the stopping element; the movable portion also including at least one guiding surface configured and sized to reposition the sprocket portion in a second desired position and to engage the movable element with a corresponding stopping element.

Other objects, advantages and features of the present invention will become more apparent upon reading of the following non-restrictive description of preferred embodiments thereof, given by way of example only with reference to the accompanying drawings.

BRIEF DESCRIPTION OF THE DRAWINGS

In the appended drawings:

FIG. 1 is a side elevational view of a bicycle provided with a variable ratio drive system according to an embodiment of the present invention, the drive system being provided with front and rear variable diameter sprockets;

FIG. 2 is an exploded perspective view of the rear variable diameter sprocket of FIG. 1, illustrating the various elements forming one of the five movable sprocket portions;

FIG. 3 is a side elevational view of a portion of the rear sprocket of FIG. 1, illustrated in a position where one of the sprocket portions is about to be moved;

FIG. 4 is a side elevational view similar to FIG. 3, where one of the sprocket portion is being moved;

FIG. 5 is a side elevational view similar to FIG. 3, where the displacement of one of the sprocket portion is completed;

FIG. 6 is a side elevational view similar to FIG. 3, where the sprocket portion is already positioned in the position dictated by the sprocket diameter changing mechanism;

FIG. 7 is a sectional view taken along line 7—7 of FIG. 3;

FIG. 8 is a sectional view taken along line 8—8 of FIG. 4;

FIG. 9 is a sectional view taken along line 9—9 of FIG. 5;

FIG. 10 is an exploded perspective view of the front variable diameter sprocket of FIG. 1, illustrating the various elements forming one of the five movable sprocket portions;

DESCRIPTION OF THE PREFERRED EMBODIMENT

Figure 11:
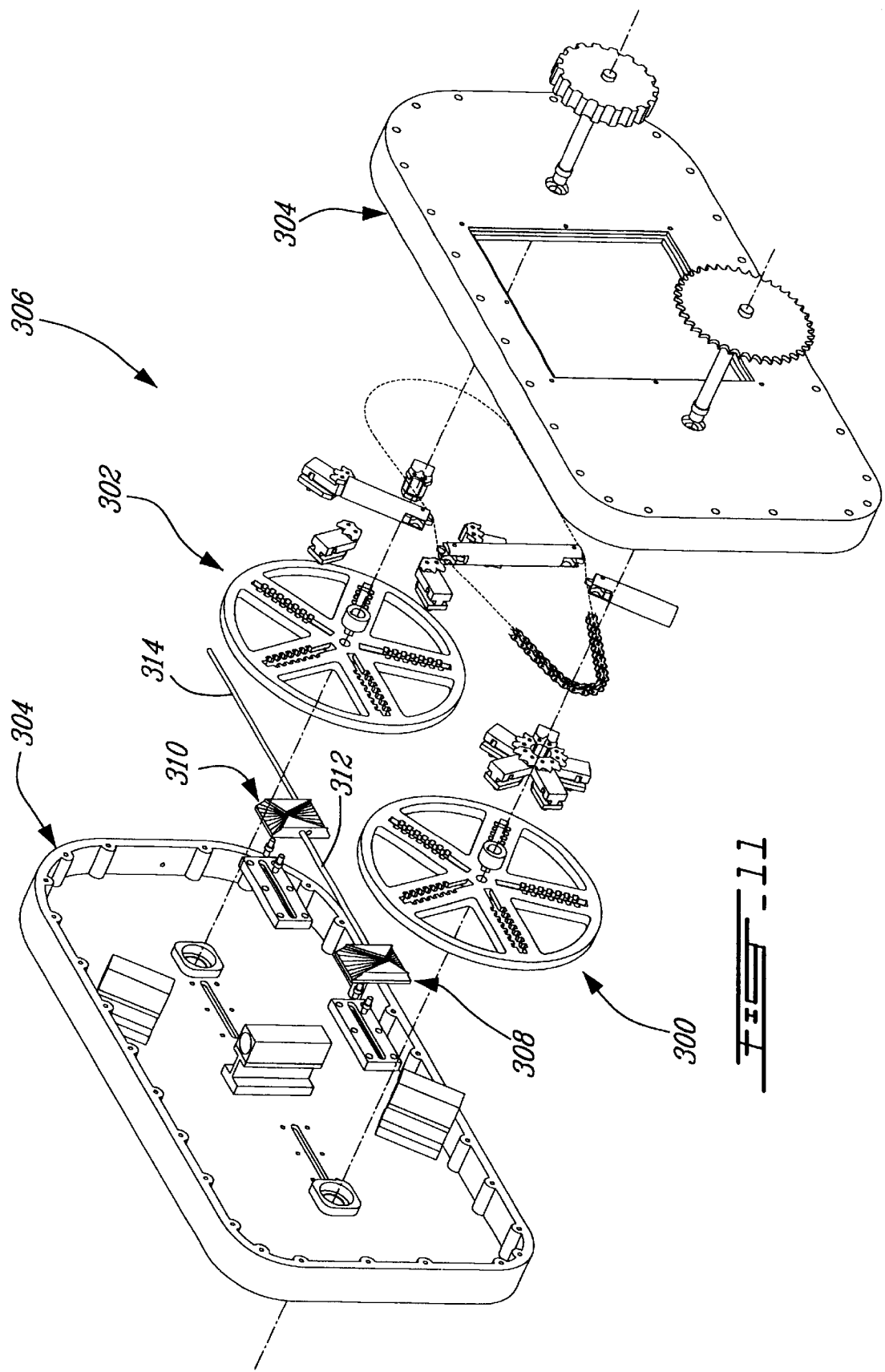
FIG. 11 is an exploded perspective view of an enclosed transmission system according to an embodiment of the present invention.
Figure 12:
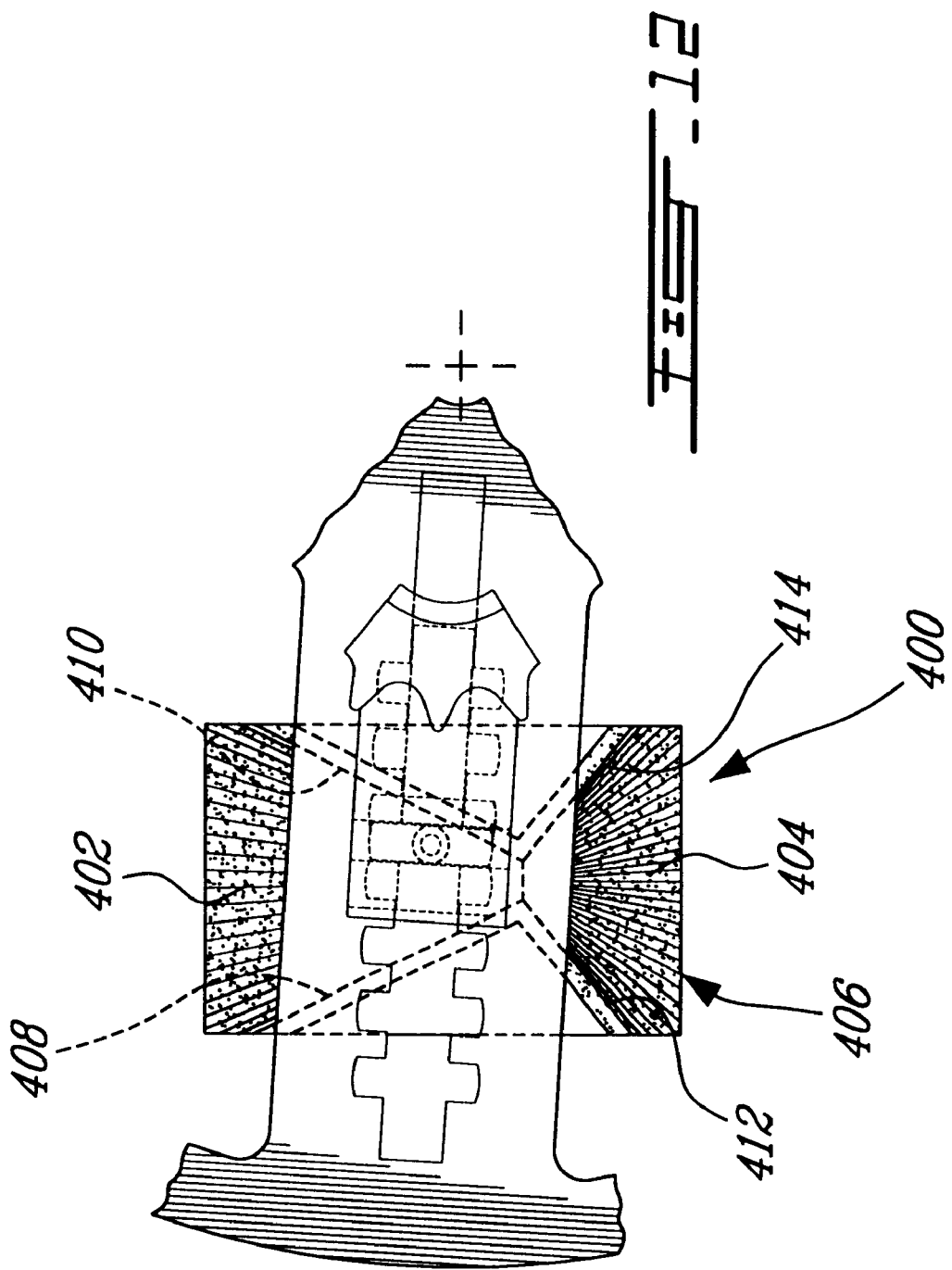
FIG. 12 is a side elevational view of a portion of a sprocket assembly and of a sprocket diameter changing mechanism according to another embodiment of the present invention.

Turning now to FIGS. 1 to 10 of the appended drawings, a first embodiment of a variable ratio drive system according to the present invention will be described.

FIG. 1 schematically illustrates, in dashed lines, a bicycle 20 provided with a variable ratio drive system including a front variable diameter sprocket 22, a rear variable diameter sprocket 24, a front sprocket diameter changing mechanism 26, mounted to a proximate portion of the chain stay 28 of the bicycle 20, and a rear sprocket diameter changing mechanism 30, mounted to a distal portion of the chain stay 28.

These two sprockets 22 and 24 are linked through a conventional bicycle chain 32 that is kept under proper tension by a chain tensioning mechanism 34.

As can be seen from FIG. 1, the rear variable diameter sprocket 24 includes a generally circular support 36 provided with five arms 38a–38e.

As can be better seen from FIG. 2, these arms 38a–38e extend from a central portion 40 to a peripheral portion 42 of the support 36.

For concision purposes, only the features of arm 38a, which are identical to the features of the other arms 38b–38e, will be described. The arm 38a is provided with a shouldered radial aperture 44 generally extending from the central portion 40 to the peripheral portion 42 of the support 36. This aperture 44 is provided with side notches 46 equally spaced on either sides of the aperture. These notches 46 define stopping elements as will be described hereinbelow. Of course, as will be apparent to one skilled in the art, the apertures 44 could be replaced by other types of sprocket portion retaining means (not shown) without departing from the spirit of the present invention. Similarly, other types of sprocket portion position maintaining means could replace the notches 46.

As can also be seen from FIG. 2, the central portion 40 is provided with an aperture 48 configured and sized to allow the support 36 to be mounted to a driving or driven shaft (not shown).

Returning briefly to FIG. 1, five movable sprocket portions 50a–50e are respectively mounted in the aperture of the arms 38a–38e. For concision purposes and since the five movable sprocket portions 50a–50e are identical, only sprocket portion 50a will be described in details hereinbelow with reference to FIG. 2.

The movable sprocket portion 50a includes a body 52 having a proximate end 54 and a distal end 56, a dented portion 58 to be mounted to a complementary receiving arrangement 60 of the proximate end 54 via fasteners (not shown), a biasing element in the form of a compression spring 62, a generally T-shaped movable element 64 and a body cover 66.

The body 52 is itself generally T-shaped having a narrower longitudinal portion 68 configured and sized to enter the aperture 44. A transversal cutout 70 is provided in the body 52. This cutout 70 is configured and sized to receive the head portion 72 of the T-shaped movable element 64. As can be better seen from FIG. 7, the compression spring 62 is inserted in an aperture 74 of the head portion 72 and abuts the bottom of the cutout portion 70. The spring 62 therefore biases the movable element 64 away from the cutout 70. As will easily be understood by one skilled in the art, other types of interconnecting means (not shown) could replace the T-shaped movable element 64.

Returning to FIG. 2, the cover 66 includes three mounting apertures 76 used to connect the cover to the narrow portion 68 of the body 52 via fasteners (not shown). A fourth aperture 78 of the cover 66 is provided to allow the stem 80 of the movable element therethrough.

As will be apparent to one skilled in the art, the movable element 64 defines, with the complementary notches 46 of the aperture 44, a selective locking mechanism allowing, in this case, to lock the movable sprocket portions 50a–50e in seven (7) radial positions, thereby yielding a variable diameter sprocket having seven (7) possible diameters.

Referring now to FIGS. 3 and 7, the rear sprocket diameter changing mechanism 30 will be described. This mechanism 30 includes a bracket 82 provided with a shouldered oblong slot 84, two guiding pins 86 and 88 configured and sized to laterally slide in the aperture 84 and a movable sprocket portion guide 90. As is better seen in FIG. 7, the guiding pins 86 and 88 are also mounted to the movable guide 90 thereby allowing the guide 90 to laterally move in the slot 84 of the bracket 82. The mechanism 30 also includes means (not shown) to selectively move the guide 90 in the slot 84 and maintain the guide at predetermined lateral position therein. These types of positioning means are believed to be known to those skilled in the art.

The guide 90 will now be described with respect to FIGS. 3 and 7. The guide 90 includes an inlet ramp 92, an outlet ramp 94, first and second triangular wall forming portions 96 and 98 and a throat 100 between the inlet and outlet ramps. As will easily be understood by one skilled in the art after reading the ongoing description, the width of the throat 100 is slightly larger than the diameter of the stem 80.

Each of the inlet and outlet ramps 92 and 94 generally defines a frusto-conical surface used to push the stem 80, in the case of the inlet ramp 92, and to allow the stem 80 to go back to its resting position, in the case of the outlet ramp 94.

The inlet ramp 92 is delimited by two angled walls 102 and 104. Similarly, the outlet ramp 94 is delimited by two angled walls 106 and 108. The purpose of these walls will be described hereinbelow in the description of the operation of the sprocket 22.

The operation of the front variable diameter sprocket 22 will now be described with reference to FIGS. 3 to 9.

FIG. 3 illustrates a portion of the support 36 where the head 72 of the movable element 64 is engaged to the third innermost set of notches 46. The guide 90 has however been so moved as to enlarge the diameter of the front sprocket 22. The throat 100 is thereby aligned with the central set of notches 46.

The consequence of this repositioning of the guide 90 is that the five movable sprocket portions 50a–50e will be moved from the third innermost set of notches to the central set of notches in one complete turn (see arrow 109) of the support 36.

As can be better seen from FIG. 7 of the appended drawings, which is a sectional view taken from FIG. 3, the stem 80 of the movable element 64 is partially pushed up (see arrow 110) by the inlet ramp 90. It is to be noted that the configuration and size of both the ramp 90 and the movable element 64 is such that the stem 80 is positioned over the ramp 90 before contacting it, thereby ensuring a gentler contact therebetween.

Turning now to FIGS. 4 and 8, the actual displacement of the sprocket portion 50a will be described. As can be seen from FIG. 8, the head portion 72 of the movable element 64 is completely enclosed in the cutout portion 70 of the body sprocket portion 50a, thereby completely compressing the compression spring 62 and positioning the movable element 64 in an unlocked position. Since the head portion 72 is no longer engaged to notches 46, the sprocket portion 50a is free to radially move in the aperture 44.

FIG. 4 illustrates that the stem 80 contacts the angles wall 104. This contact with an angled wall, along with the rotational movement (see arrow 109) of the support 36, causes an outward radial movement of the sprocket portion 50a (see arrow 112).

FIG. 5 illustrates the final position of the sprocket portion 50a after its outward radial movement. The stem 80 is aligned with the throat 100, thereby bringing the head portion 72 in overlying relationship with the central set of notches 46.

This position of the stem 80 thereby allows it to go from the inlet ramp 92 to the outlet ramp 94. Since the outlet ramp is designed so that it is generally downwardly sloping from the throat 100 to the outlet edge, the continued rotational movement (see arrow 109) of the support 36 will allow the compression spring 62 to bias the movable element 62 towards the support 36. This biasing action will force the insertion of the head portion 72 in the central set of notches 46, thereby positioning the movable element 64 in a locked position to lock the movable sprocket portion 50a in the position shown in FIG. 5.

Briefly, FIGS. 6 and 9 illustrate that when the movable sprocket portion 50a is so positioned that the stem 80 is aligned with the throat 100, no radial movement occurs.

Of course, the above description of the movement of the sprocket portion 50a from the third innermost set of notches to the central set of notches has been given as an example only. The same principle of operation applies to any movement between adjacent set of notches. Indeed, when the guide 90 is radially moved towards the center of the support 36, the angled wall 102 is used to correspondingly move the sprocket portions 50a–50e towards an innermost set of notches, thereby reducing the diameter of the rear variable diameter sprocket 24.

It is to be noted that the rear sprocket diameter changing mechanism 30 is so positioned that it only contacts the movable sprocket portions when they are not engaged to the chain 32.

As will be easily understood by one skilled in the art, the outlet ramp 94 is used for example when the user is "back-pedaling". It could also be designed to allow variation of the diameter of the sprocket when the user is back-pedaling.

The variable diameter sprocket 24 has many advantages, including:

it is possible to design a variable diameter sprocket that has a very small smaller diameter without having to sacrifice the structural integrity of the support 36 since the dented portion 58 is provided at the proximate end 54 of the sprocket portion 50a and the locking mechanism is provided near the distal portion 56;

a simpler tensioning mechanism can be used since the chain 32 is always in the same plane.

As will easily be understood by one skilled in the art, since the chain 32 is generally maintained in a single plane, the chain tensioning mechanism 34 may be mounted anywhere on the chain stay 28.

Of course, the sets of notches 46 could be replaced by other types of stopping elements configured to cooperate with complementary movable elements to provide the functionality described hereinabove without departing from the present invention. As a non-limiting example, the notches 46 could be replaced by series of apertures (not shown) provided on either sides of each aperture 44. Accordingly, the T-shaped movable element would be provided with projections (not shown) configured and sized to engage the apertures.

Turning now to FIGS. 1 and 10 of the appended drawings, the front variable diameter sprocket 22 will be described. It is to be noted that only the differences between the front variable diameter sprocket 22 and the rear sprocket 24 described hereinabove will be described. Furthermore, since the operation of the front variable sprocket 22 is identical to the operation of the rear variable sprocket 24, its description will not be repeated hereinbelow.

The main difference between the variable diameter sprockets 22 and 24 is that the movable sprocket portions 200a–e of the front sprocket 22 (only one shown in FIG. 10) are such that the dented portion 202 mounted thereto is so configured as to abut the peripheral surface 204 of the support 36 when the sprocket 22 is in its smaller diameter configuration. In other words, the dented portion 202 is provided at a distal end of the sprocket portion 200a while the selective locking mechanism is provided near the proximate end of the sprocket portion 200a.

It is to be noted that even though the front and rear variable diameter sprockets 22 and 24 operate in an identical fashion, the sprocket portions 200a–e of the front sprocket 22 are such that, while using the same support 36 as the rear sprocket 24, it is possible to obtain a larger diameter sprocket. This is achieved by displacing the dented portion of each sprocket portion towards the distal end of the sprocket portion body. Of course, this displacement of the teeth is such that it is not possible to reach diameters as small as reached with the rear sprocket 24.

As will easily be understood by one skilled in the art, the two sprocket diameter changing mechanisms 26 and 30 (FIG. 1) could be so linked as to move simultaneously (not shown). A drawback of such a link is that the number of different speeds of the vehicle is reduced. However, this link has the advantage that a chain having generally the correct size may be used, thereby eliminating or reducing the need of a chain tensioning mechanism.

Turning now to FIG. 11 of the appended drawings, a second possible application of the variable diameter sprocket of the present invention will be described. In this figure, two variable diameter sprockets 300 and 302 are mounted in an enclosure 304 to yield a transmission 306 that may be used, for example, in the construction of an electric vehicle (not shown). It is to be noted that the two diameter changing mechanisms 308 and 310 are linked through a rod 312, thereby allowing the diameter ratio changes through a single actuator 314.

Finally, turning to FIGS. 12 to 15, a different embodiment of the diameter changing mechanism 400 will be described.

The difference between this mechanism 400 and the mechanism 30 described hereinabove with respect to FIGS. 1 to 10 is that instead of mechanically pushing the stem 80 of the sprocket portion to selectively unlock the sprocket portion from the support, magnets are used to thereby prevent metal to metal contact. The ramps 402 and 404 of the guide 406 and the angled walls 408, 410, 412 an 414 are provided with a magnetic coating having a given polarity while the tip 416 of the stem 80 (see FIG. 13) is provided with a magnet of opposite polarity. Of course, the magnetic coatings are advantageously chosen so as to provide a magnetic field having a strength sufficient to provide adequate repulsion therebetween.

Figure 13:
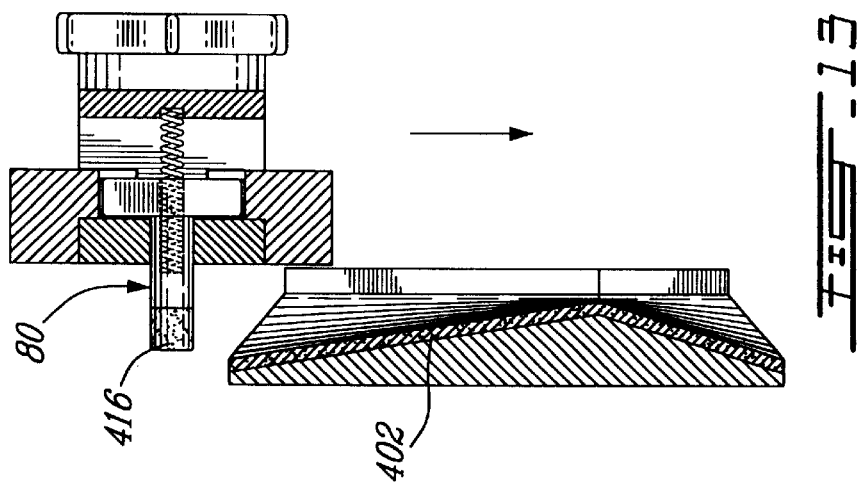
FIG. 13 is a sectional view illustrating the sprocket assembly and the sprocket diameter changing mechanism of FIG. 12 before the sprocket assembly reaches the sprocket diameter changing mechanism.
Figure 14:
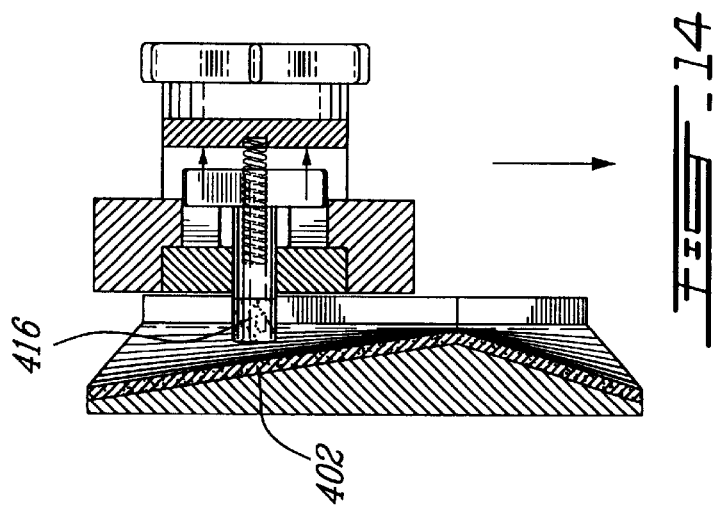
FIG. 14 is a sectional view similar to FIG. 13, illustrating the sprocket assembly during the retraction of the locking element.
Figure 15:
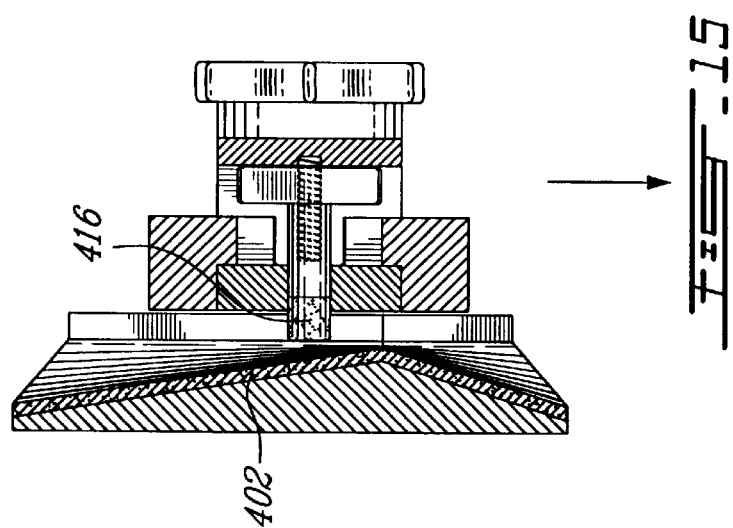
FIG. 15 is a sectional view similar to FIG. 13, illustrating the locking element fully retracted.

As can be better seen in FIGS. 13 to 15, there is no contact between the stem 80 and the guide 406 while the stem is pushed by magnetic repulsion.

It is to be noted that the stem 80 and ramps 402 and 404 are so configured that, should the magnetic repulsion fail, the contact between the ramps and the stem would operate the variable diameter sprocket as discussed hereinabove with respect to FIGS. 1 to 9.

Although the present invention has been described hereinabove by way of preferred embodiments thereof, it can be modified, without departing from the spirit and nature of the subject invention as defined in the appended claims.

What is claimed is:

1. A variable ratio drive system comprising:
    a variable diameter sprocket including:
        a support having a rotation axis and at least three radial apertures; each aperture being provided with at least two stopping element;
        at least three sprocket portions, each being so mounted to a respective one of said at least three radial aperture of said support as to be radially movable therein; each of said at least three sprocket portions includes a movable element configured and sized to interconnect with said at least two stopping element to selectively maintain the sprocket portion in a desired radial position; each sprocket portion also includes a biasing element mounted thereto to bias said movable element towards said at least two stopping element;
    a sprocket diameter changing mechanism including:
        a fixed portion; and
        a movable portion mounted to said fixed portion; said movable portion including a pushing surface so positioned and configured as to overcome a biasing action of said biasing element through a pushing action on said movable element of said sprocket portion; said pushing action causing the disengagement of said movable element from one of said stopping element; said movable portion also including at least one guiding surface configured and sized to reposition said sprocket portion in a second desired position and to engage said movable element with a corresponding stopping element.

2. A variable ratio drive system as recited in claim 1, wherein each said at least two stopping elements includes a pair of lateral notches provided on either sides of said aperture.

3. A variable ratio drive system as recited in claim 2, wherein said at least two stopping elements includes seven stopping elements.

4. A variable ratio drive system as recited in claim 1, wherein a) said at least three apertures include five apertures and b) said at least three sprocket portions include five sprocket portions.

5. A variable ratio drive system as recited in claim 1, wherein each said at least three sprocket portions includes:
   a body having a generally T-shape cross-section and proximate and distal ends;
   a dented portion mounted to said body near one of said proximate and distal ends.

6. A variable ratio drive system as recited in claim 5, wherein each said sprocket portion also includes a transversal cutout and wherein said movable element is generally T-shaped defining a head portion; said movable element being configured and sized to selectively move between a) a locked position where said movable element interconnects with one of said at least two stopping elements of a corresponding aperture and b) an unlocked position where it enters said transversal cutout portion of said body.

7. A variable ratio drive system as recited in claim 6, wherein each said sprocket portion includes a biasing element mounted between said body and said movable element to bias said moving element towards said locked position.

8. A variable ratio drive system as recited in claim 1, wherein said movable portion of said sprocket diameter changing mechanism includes an inlet ramp and an outlet ramp.

9. A variable ratio drive system as recited in claim 8, wherein said movable portion also includes two wall forming portions defining angled sprocket positioning walls.

10. A variable ratio drive system as recited in claim 9, wherein said two wall forming portions are so configured and sized to define a throat therebetween.

11. A variable ratio drive system comprising:
   a variable diameter sprocket including:
      a support having a rotation axis;
      at least three sprocket portions having a longitudinal body provided with opposite ends: each said at least three sprocket portions being so mounted to said support as to be radially movable with respect to said rotation axis; each of said at least three sprocket portions is so configured that it may be selectively maintained in a desired radial position; each of said at least three sprocket portions comprising a dented portion provided near one of said opposite ends of said longitudinal body,
      a sprocket diameter changing mechanism configured to interact with said at least three sprocket portions to selectively maintain said sprocket portions in said desired radial position; said sprocket diameter changing mechanism including a fixed portion and a movable portion mounted to said fixed portion; said movable portion provided with a pushing surface so positioned and configured as to overcome a biasing action of a biasing element selectively maintaining a movable element of said sprocket portion is said desired radial position through a pushing action on said movable element of said sprocket portion; said pushing action causing the disengagement of said movable element from a stopping element of said support; said movable portion also including at least one guiding surface configured and sized to reposition said sprocket portion in a second desired position and to engage said movable element with a corresponding stopping element of said support.

12. A variable ratio drive system comprising:
   a variable diameter sprocket including:
      a support having a rotation axis and at least three sprocket portion retaining means each being provided with at least two sprocket portion position maintaining means;
      at least three sprocket portions, each being so mounted to a respective one of said at least three sprocket portion retaining means of said support as to be radially movable; each of said at least three sprocket portions includes means to interconnect with said at least two sprocket portion position maintaining means to selectively maintain the sprocket portion in a desired radial position; each sprocket portion also includes biasing means so mounted thereto to bias said interconnecting means towards said at least two sprocket portion position maintaining means;
   means for changing the diameter of said variable diameter sprocket, said sprocket diameter changing means including:
      a fixed portion; and
      a movable portion so mounted to said fixed portion as to be movable; said movable portion including means for overcoming a biasing action of said biasing means through a pushing action on said interconnecting means of said sprocket portion; said pushing action causing the disengagement of said interconnecting means from one of said sprocket portion retaining means; said movable portion also including at least one guiding means configured and sized to reposition said sprocket portion in a second desired position and to engage said interconnecting means with a corresponding sprocket portion retaining means.

13. A variable ratio drive system comprising:
   first and second variable diameter sprockets, each including:
      a support having a rotation axis and at least three radial apertures; each aperture being provided with at least two stopping element;
      at least three sprocket portions, each being so mounted to a respective one of said at least three radial aperture of said support as to be radially movable therein; each of said at least three sprocket portions includes a movable element configured and sized to interconnect with said at least two stopping element to selectively maintain the sprocket portion in a desired radial position; each sprocket portion also includes a biasing element mounted thereto to bias said movable element towards said at least two stopping element;
   first and second sprocket diameter changing mechanisms each including:
      a fixed portion; and
      a movable portion mounted to said fixed portion; said movable portion including a pushing surface so positioned and configured as to overcome a biasing action of said biasing element of a corresponding variable diameter sprocket through a pushing action on said movable element of said sprocket portion; said pushing action causing the disengagement of said movable element from one of said stopping element; said movable portion also including at least one guiding surface configured and sized to reposition said sprocket portion in a second desired position and to engage said movable element with a corresponding stopping element.

14. A variable ratio drive system as recited in claim 13, wherein said first and second sprocket diameter changing mechanisms are so interconnected as to move simultaneously.

* * * * *